United States Patent [19]

Zahn

[11] 3,969,811

[45] July 20, 1976

[54] METHOD FOR APPLYING DESIGNS TO PIERCEABLE MATERIALS

[75] Inventor: Irwin Zahn, New York, N.Y.

[73] Assignee: General Staple Company, Inc., New York, N.Y.

[22] Filed: June 23, 1975

[21] Appl. No.: 589,032

Related U.S. Application Data

[62] Division of Ser. No. 396,462, Sept. 12, 1973, Pat. No. 3,902,866.

[52] U.S. Cl. .............................. 29/417; 29/208 D; 29/211 D; 29/432.1

[51] Int. Cl.$^2$ .............................. B23P 17/00

[58] Field of Search .......... 29/417, 407, 414, 193.5, 29/432, 200 B, 203 D, 208 D, 211 D, 432.1; 227/82, 1, 87, 88, 90, 136; 85/49, 13, 17; 161/49, 53, 54

[56] References Cited

UNITED STATES PATENTS

| | | | |
|---|---|---|---|
| 977,342 | 11/1910 | Stroh | 227/87 |
| 1,990,915 | 2/1935 | Mortimer | 29/208 D X |
| 2,314,184 | 3/1943 | Zeruneith | 227/90 |
| 2,431,812 | 12/1947 | Lang | 227/136 X |
| 2,754,516 | 7/1956 | Gasstrom | 29/417 X |
| 3,636,611 | 1/1972 | Rosenbaum | 29/203 D |
| 3,753,279 | 8/1973 | Eppler | 29/203 D |

*Primary Examiner*—Victor A. DiPalma

*Attorney, Agent, or Firm*—Lerner, David, Littenberg & Samuel

[57] ABSTRACT

An apparatus and method are disclosed for applying designs to pierceable materials, such as fabrics, paper goods, leather, etc., from a continuous supply strip containing intermittent design portions equally spaced along the length of the supply strip. The apparatus comprises feeding means for intermittently feeding the supply strip to a shearing, bending, driving and clinching station positioned above a clinching die; shearing means for severing a length of said supply strip from the end thereof; bending means for bending the cut off length into an approximately U-shaped member having a bight portion and side leg portions; driving means for driving the U-shaped member into the clinching die and through any pierceable material positioned above the die; and locater means for establishing a proper start position for the supply strip so that the design portions thereof will constitute the bight portions of the U-shaped members. The novel supply strip for use with the method and apparatus comprises a continuous elongated strip, preferably of metal, having juxtaposed design and crimping portions so that every other portion of the strip is a design portion with all of the design portions being of a first predetermined length and all of the crimping portions being of a second predetermined length, whereby the design portions will be separated by equal intervals. The supply strip includes means for establishing a proper start position such that the design portions will properly end up constituting the bight portion of the U-shaped member formed and driven by the apparatus hereof.

4 Claims, 22 Drawing Figures

FIG. 1A
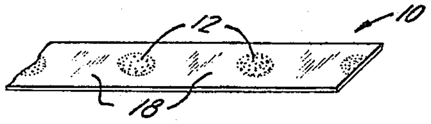
FIG. 1B
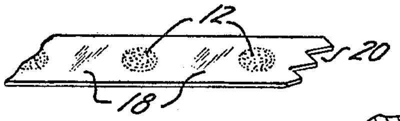
FIG. 1C
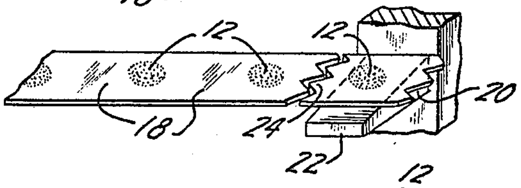
FIG. 1D
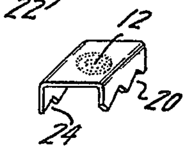
FIG. 1E
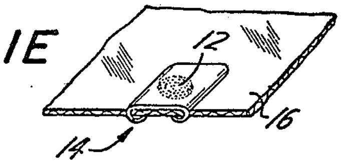
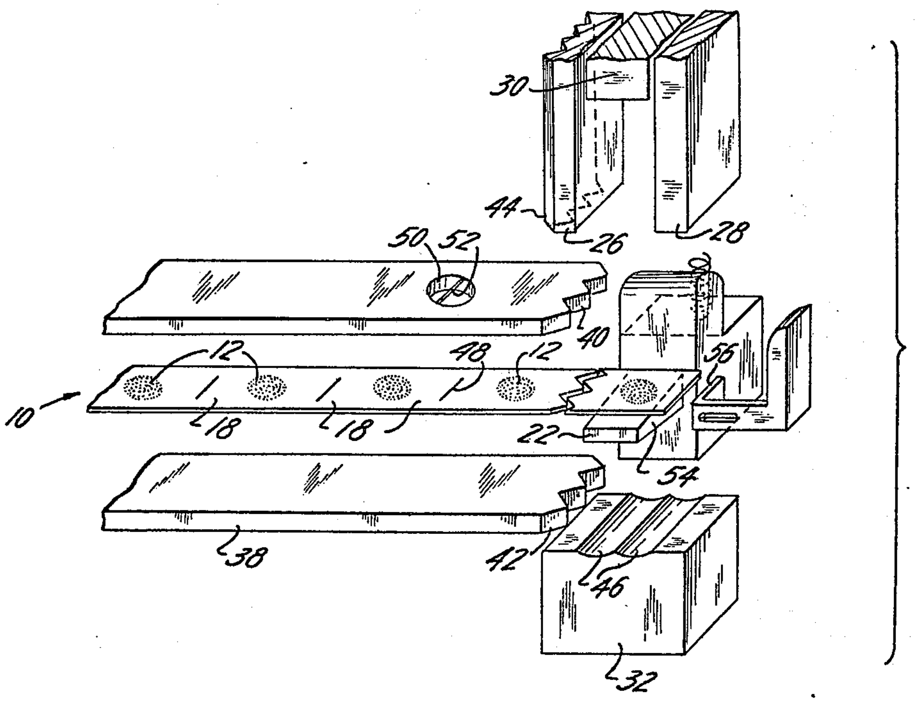
FIG. 2

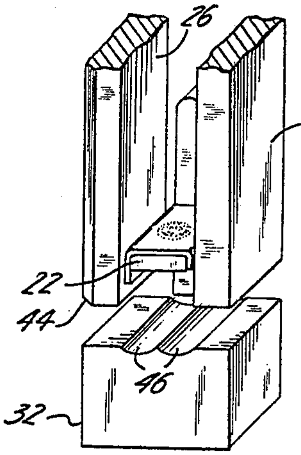
FIG. 2A
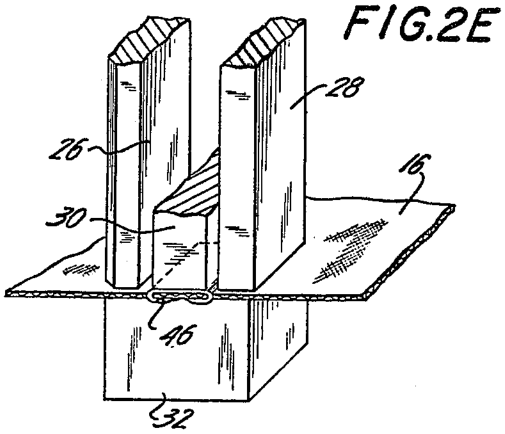
FIG. 2E
FIG. 2B
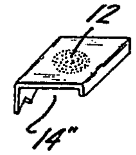
FIG. 2C
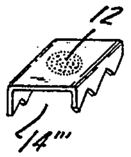
FIG. 2D
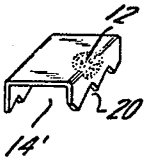
FIG. 3
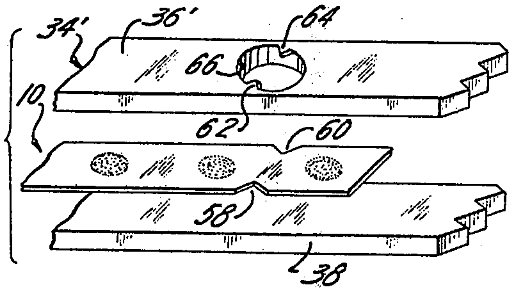
FIG. 4
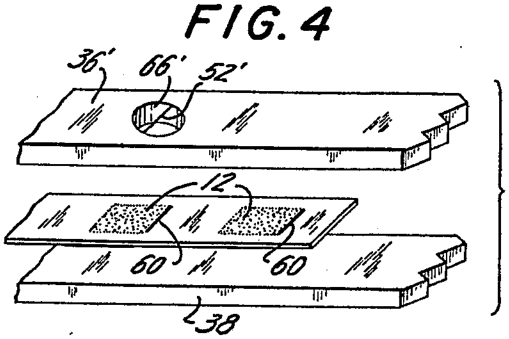
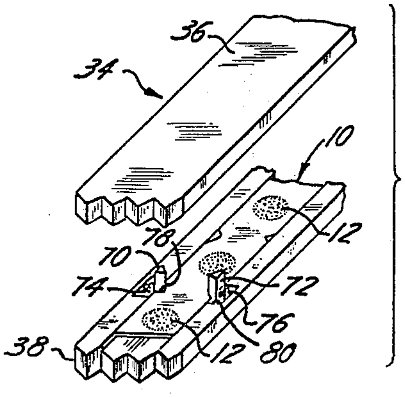
FIG. 5
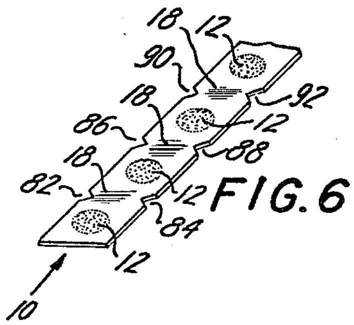
FIG. 6

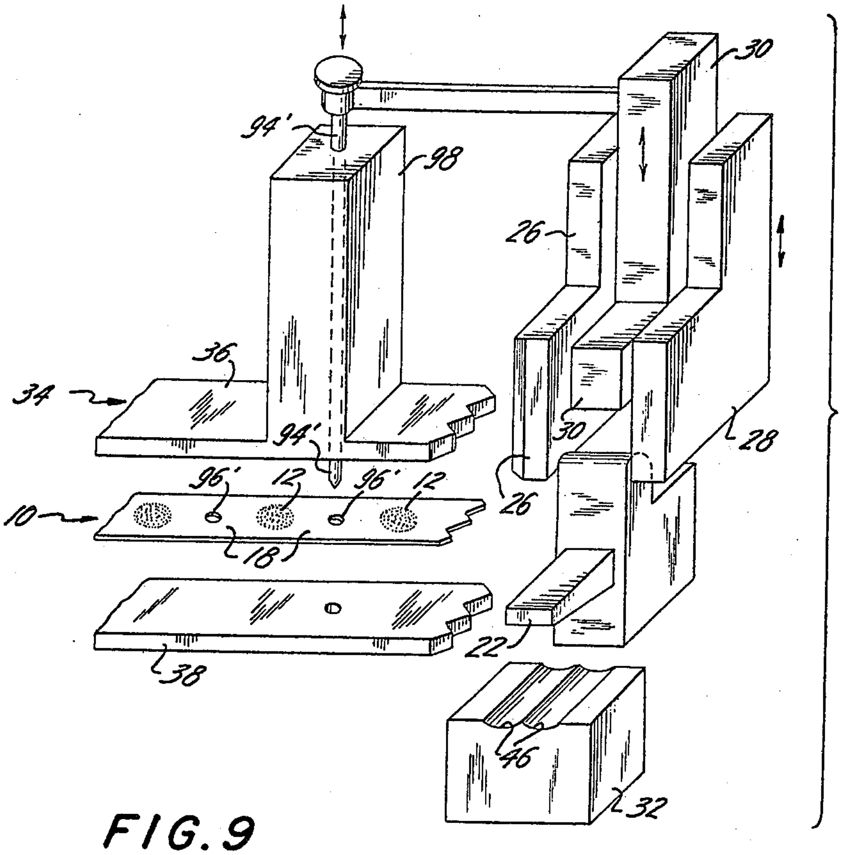
FIG.8
FIG.9
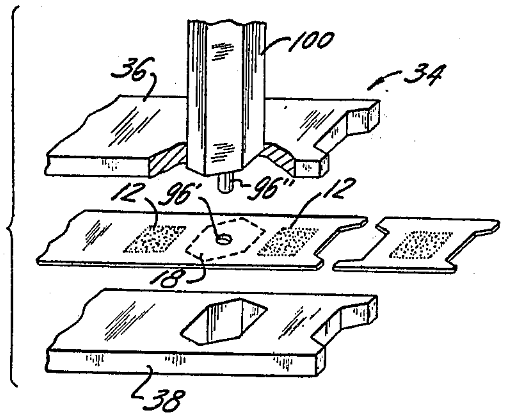
FIG.7
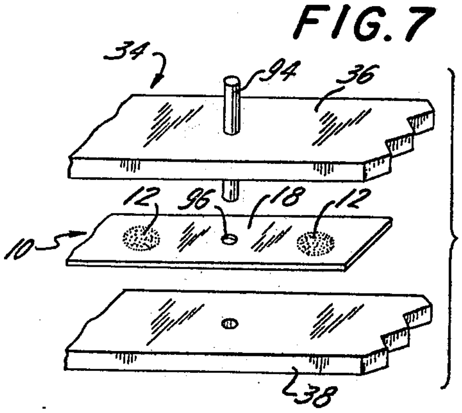
FIG.10
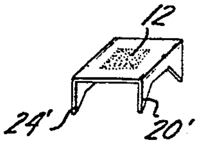
FIG.11
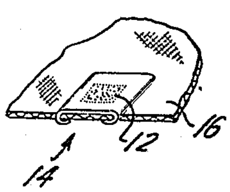

METHOD FOR APPLYING DESIGNS TO PIERCEABLE MATERIALS

This is a division of application Ser. No. 396,462 filed Sept. 12, 1973, and now U.S. Pat. No. 3,902,866.

BACKGROUND OF THE INVENTION

In the U.S. Pat. No. 3,636,611 issued Jan. 25, 1972, to Irving W. Rosenbaum and assigned to the assignee of the present invention, there is disclosed and claimed apparatus for splicing wires which operates from a continuous supply strip. As is disclosed in detail in the aforementioned patent, the continuous supply strip is incrementally fed to an attaching station where, in one operation, a splice is automatically formed, driven and clinched about a pair of wires which are to be electrically and mechanically joined. Although the apparatus of the aforementioned Rosenbaum patent functions extremely well to splice electrical wires, and in fact has enjoyed widespread success in the industry, prior to the instant invention, the utility of the apparatus of the Rosenbaum patent has been confined solely to the splicing of electrical wires.

SUMMARY OF THE INVENTION

The inventor hereof has conceived of an apparatus constructed in accordance with the basic principles of the Rosenbaum patent and, in so doing, has developed not only a new apparatus and method employing same, but also a new continuous supply strip to be employed in conjunction therewith. Specifically, and as will be described in greater detail, the inventor hereof has employed the heart of the Rosenbaum apparatus for applying designs to pierceable materials such as fabric, paper goods, leather, etc., in a fast, automated manner which eliminates the necessity of handling individual preformed designs such as paper and woven labels, and which at the same time can be applied by relatively unskilled personnel.

The novel continuous supply strip comprises alternately spaced design portions which may be printed or embossed on the continuous strip (which may be metal or other material). Intermediate the design portions are crimping portions which eventually form the sides of a U-shaped, staple-like member which is applied to the pierceable material by the apparatus hereof and the strip further includes means to establish a proper start position which cooperates with locater means provided on the apparatus hereof in such a manner as to guarantee that the design portions of the strip ultimately end up as the visible design bearing bight portions of the U-shaped member which is applied to the pierceable material by a piercing and crimping operation.

BRIEF DESCRIPTION OF THE SEVERAL VIEWS OF THE DRAWING

FIG. 1A through FIG. 1E illustrate the progressive steps carried out by the novel apparatus and method of the instant invention and in conjunction with a novel design bearing continuous strip construction in accordance with the instant invention.

FIG. 2 illustrates in an exploded prospective view, the basic components of the apparatus hereof, and further illustrates one variation of the apparatus and the supply strip used in conjunction therewith for establishing a proper start position for the supply strip.

FIGS. 2A and 2E illustrate the operations of bending and crimping of the attachment, respectively.

FIGS. 2B and 2C illustrate the first attachment formed and subsequent attachments formed, respectively.

FIG. 2D illustrates an improperly located design on the formed attachment.

FIG. 3 illustrates an alternative embodiment of the apparatus and supply strip hereof.

FIG. 4 illustrates yet another alternative embodiment of the apparatus and supply strip hereof.

FIG. 5 illustrates still another embodiment of the apparatus hereof.

FIG. 6 illustrates yet another embodiment of the novel supply strip hereof.

FIG. 7 illustrates yet another embodiment of a portion of the apparatus hereof.

FIG. 8 illustrates in exploded prospective view still another embodiment of the apparatus hereof and the supply strip associated therewith.

FIG. 9 illustrates in an exploded prospective view, partially cut away for the sake of clarity, a portion of yet another embodiment of the apparatus and supply strip associated therewith.

FIG. 10 shows a U-shaped, staple-like element constructed with the apparatus of FIG. 9.

FIG. 11 shows the staple-like element of FIG. 10 as it is secured to a pierceable element such as fabric.

DETAILED DESCRIPTION

Figure 12:
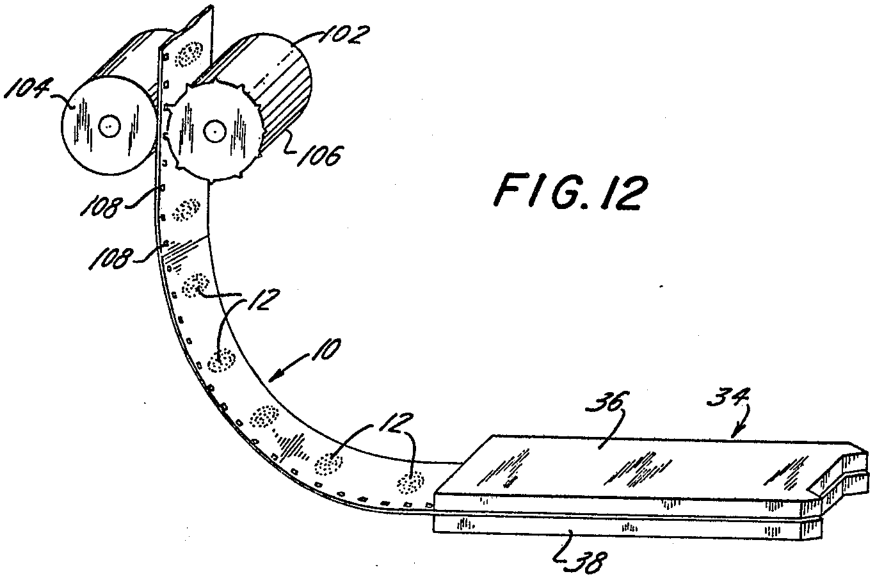
FIG. 12 shows still another embodiment of a portion of the apparatus hereof and supply strip associated therewith.

Turning to the Figures wherein like numerals designate like elements and primed numerals designate corresponding elements of alternative embodiments, there is shown in FIGS. 1A through 1E a novel supply strip 10 constructed in accordance with the teachings of the instant invention for use in the method and apparatus of the instant invention. The strip 10 is a continuous elongated strip of any convenient material, preferably metallic, which is sufficiently pliable and maleable as to be capable of being formed into a given shape, and which has sufficient memory to retain such shape. After being provided with the repetitive design portions indicated at 12, and to be described in greater detail, the elongated supply strip 10 is stored and transported in coil form for use with the apparatus to be subsequently described.

The design portions 12 may be of any color or combination of colors, may take any design configuration such as letters, numerals, trademark logos, geometric patterns, etc., and may be applied by any convenient techniques to the strip 10, for example, by printing, embossing, hot stamping, etc. It will be appreciated, and will be described in greater detail, that the end result is to apply a staple-like attachment 14 to a pierceable material 16 (see FIG. 1E) such as fabric, paper goods, leather goods, or any other material which may be pierced, with the decorative design portion 12 visually observable.

As noted previously, and as will be explained in further detail, the apparatus and method for applying the attachment 14 of FIG. 1E is in a great many respects similar to the wire splicing apparatus described in the aforementioned U.S. Pat. No. 3,636,611, and the steps involved in forming, driving and clinching the attachment 14 are, therefore, similar to the steps employed in the Rosenbaum apparatus. To briefly summarize the process, and with reference to FIGS. 1A through 1E, the supply strip 10 comprising the design portions 12, separated by crimping portions 18 is incrimentally fed to a forming, driving and crimping station where, during the first cycle of operation, a shearing surface descends to bisect the first crimping portion 18 and establish a serrated leading edge crimping portion 20. Thereafter, after the next incrimental feed of the supply strip 10, (during which the design portion 12 becomes draped over a retractable anvil 22) the same shearing surface descends to establish the serrated trailing edge crimping portion 24. As in the apparatus of the Rosenbaum patent, during the descent of the shearing mechanism, a pair of bending tools (26 and 28 in FIG. 2) descend to bend the leading edge crimping portion 20 and trailing edge crimping portion 24 about the anvil 22 to form the generally U-shaped staple-like member seen in FIG. 1D. Immediately thereafter, a driving ram (30 in FIG. 2) descends to drive the crimping portions 20 and 24 through the pierceable material 16 which has been positioned therebeneath and into a clinching die 32 (in FIG. 2) which causes the crimping portions to curl under and grasp the undersurface of the material 16 to which the attachment 14 has been applied. What remains visible on the outer surface of the material 16 is the design portion 12 which, as noted previously, is the decorative design which was desired to be applied to the material.

It should be appreciated that it is absolutely imperative that some means be provided to accurately establish the start position for the supply strip with respect to the apparatus which will subsequently sever, bend and drive the U-shaped member through the material to which the attachment is to be applied. Thus, if the supply strip is not properly positioned at the outset, for example, if the design portion 12 does not end up centered over the anvil 22, the end result is that an attachment such as 14' in FIG. 2D will result wherein the design portion 12 is only partially on the bight portion of the U-shaped staple and partially in the leading edge crimping portion 20 which obviously would produce a finished attachment with only a portion of the design visible. In subsequent portions of this specification, various embodiments of the invention will be disclosed to establish the proper starting position for the supply strip 10.

Turning to FIG. 2, there is shown the basic components of the apparatus employed for forming, driving and attaching the attachments 14. Since the major components are the same as those illustrated in the Rosenbaum patent, the entire specification and drawings of the aforementioned U.S. Pat. No. 3,636,611 are specifically incorporated herein by specific reference thereto.

As noted, the supply strip 10 is fed to the forming, driving and clinching station through a cutter block 34 which actually comprises an upper and lower plate 36 and 38, respectively. It should be noted that the leading portions 40 and 42 of the plates 36 and 38, respectively, are serrated and cooperate with the shearing edge 44 provided on the outer surface of one of the bending tools 26, which tools 26 and 28 vertically reciprocate to bend the severed portion of the supply strip 10 about the retractable anvil 22 in the manner illustrated in FIG. 2A to form the U-shaped member of FIG. 1D. Thereafter, and in the manner illustrated in FIG. 2E, the reciprocating ram 30 lowers between the bending tools 26 and 28 to drive the edge crimping portions 20 and 24 through the material to which the attachment is to be applied and to the heart shaped cavity 46 provided in the clinching die 32. It is to be noted that when the ram 30 descends, it drives the anvil 22 back out of the way.

FIG. 2 also illustrates one embodiment for properly establishing the starting position for the supply strip 10. Specifically, it will be observed that the supply strip 10 includes an indicia 48 (which may be printed or etched thereon) interposed midway along the crimping portion 18, disposed between adjacent design portions 12. Additionally, the upper plate 36 of the cutter block 34 includes a viewing aperture 50 with an alignment bar 52 thereacross. In operation, when the machine is first set up, the operator manually feeds the end of the supply strip 10 through the cutter block 34 until he can allign the bar 52 with the indicia 48 provided on the supply strip 10. When alignment has been achieved, the operator knows that the supply strip is properly positioned to guarantee that the design portion 12 will always be centered across the anvil 22 during the formation of the U-shaped, staple-like members.

Illustrated in FIG. 2 is the fact that in aligning the indicia 48 with the bar guide 52, the leading edge 54 of the supply strip 10 does not reach the stop 56 positioned on the opposite side of the anvil 22. The result is that the first attachment 14'' (FIG. 2B) is a useless, deformed attachment. However, the deformed attachment does have the design portion 12 positioned on the bight portion of the U-shaped member and guarantees that all subsequent attachments 14''' in FIG. 2C will also have their design portions 12 properly oriented on the center of the bight portion thereof. It should be apparent that if the operator did not align the indicia 48 with the bar guide 52, but instead inserted the supply strip 10 all the way so that the leading edge 54 abutted the stop 56, the result would be that all attachments would be produced like the attachment 14' of FIG. 2D, namely, with the design portion 12 partially hidden beneath the material on the leading edge crimping portion 20.

In FIG. 3, there is shown a variation of the arrangement of FIG. 2 for guaranteeing that the supply strip 10 is properly located for the all important first cut. In FIG. 3, the supply strip 10 is provided with a pair of oppositely disposed notch portions 58 and 60 which can be visually aligned with guide elements 62 and 64, respectively, projecting from the sides of the viewing aperture 66 in the upper plate 36' of the cutter bar 34'.

The alternative embodiment of FIG. 4 varies from the embodiments of FIG. 2 and FIG. 3 in the sense that in this embodiment, the operator aligns the guide bar 52' provided in the viewing aperture 66' of the plate 36' with the leading edge 68 of the design portion 12 of the supply strip 10. It will be appreciated that in the embodiment of FIG. 4, the viewing aperture 66' is displaced rearwardly to compensate for the fact that the operator is aligning on the leading edge 68 of the design 12. Such an arrangement eliminates the necessity of specially treating the supply strip 10 with an indicia 48, but in all other respects has the same result of guaranteeing that design portions 12 will be properly situated on the bight portions of the U-shaped attaching member. This embodiment is preferably employed when the design 12 happens to have a definitive leading edge, such as 68 in FIG. 4.

In the embodiments of FIGS. 2 through 4, the means for establishing the proper start positions for the supply strip 10 constitute a visual alignment technique. In the embodiment of FIG. 5, the cutter block 34 is provided with a pair of upstanding detent members 70 and 72 which are spring biased by small springs 74 and 76 in interrupt the path of movement of the supply strip 10. The supply strip 10 is provided with opposing "V" notches 78 and 80 which are spaced midway along the crimping portion 18 disposed intermediate adjacent design portions 12. In this embodiment, the operator inserts the supply strip 10 until the detent members 70 and 72 spring into the notches 78 and 80, thereby establishing the proper start position. The operator may now actuate the apparatus confidently knowing that the proper spacing has been established to guarantee that the design portions 12 will always end up centrally disposed over the anvil 22 and, hence, fully visible on the attachment 14.

In the embodiment of FIG. 5, only a single pair of opposed notches 78 and 80 are provided on opposed edges of the supply strip 10. If desired, and in order to more perfectly maintain the desired alignment, the supply strip 10 may be provided with pairs of opposed notches 82, 84; 86, 88; 90, 92; etc., along the entire length of the supply strip 10, and properly spaced midway along the length of each crimping portion 18 disposed between adjacent design portions 12. The effect of this arrangement will be that upon each incremental advancement of the supply strip 10, the detent members 70 and 72 will slip into a pair of notches in the supply strip 10 and more accurately maintain the desired alignment.

In the embodiment of FIG. 7, the cutter plate 34 is provided with a manually operable guide pin 94 which is guided by corresponding apertures through the upper and lower plates 36 and 38, respectively. In like fashion, the supply strip 10 is provided with an aperture 96 which bisects the crimping portion 18 between adjacent design portions 12. In operation, at the start up, the operator inserts a supply strip 10 into the cutter block 34 until such time as it can physically pass the guide pin 94 through the aperture 96 in the supply strip. Thereafter, he removes the guide pin 94 and permits the apparatus to begin its incremental advancement knowing that even though the first attachment will most likely be an unusable deformed attachment, such as illustrated in FIG. 2B, all those thereafter will be perfect attachments with the design portion 12 properly oriented on the bight portion of the attachment. Of course, when using any of these various embodiments, the operators are instructed not to position the material to be decorated in the machine over the clinching die 32 for the first operation. Since in most cases the first attachment which will be produced will appear like that of FIG. 2B, it is desirable to operate the machine once and then being the decorating operation on the material.

In the embodiment of FIG. 8, the guide pin 94' additionally guided for reciprocating motion by a guide block 98 is directly connected to the driving ram 30. Thus, each time the driving ram 30 reciprocates, the guide pin 94' reciprocates therewith. In addition, the supply strip 10 is provided with positioning apertures 96' midway along the length of each crimping portion 18 intermediate adjacent design portions 12. In operation, the operator inserts a strip 10 into the cutter block 34 for a distance sufficient to align one such aperture 96' with the guide pin 94'. It will be appreciated that in initially setting up the machine, the ram 30 is slowly manually lowered so that the operator may align the guide pin 94' through the aperture 96'. Thereafter, the feeding mechanism (described in the Rosenbaum patent and also illustrated in FIG. 12 hereof) incrementally advances the supply strip through the cutter block 34. Each time the driving ram 30 is lowered to drive an attachment through the material and into the clinching die, the guide pin 94' will also be lowered through an aperture 96' in the supply strip to guarantee the alignment of the next attachment to be formed.

In the embodiment of FIG. 9, the guide pin 96'' is formed on the lower end of a punching ram 100 which has a peripheral configuration designed to remove a predetermined portion of the crimping portion 18 disposed between adjacent design portions 12. Although not shown in FIG. 9, it should be noted that the punching ram 100 is also driven in conjunction with the driving ram 30 such that each time the driving ram 30 is driving a previously formed attachment through the material and into the clinching die 32, the punching ram 100 is being driven to initially align the supply strip 10 (by virtue of the guide pin 96'') and subsequently punch out the central portion of the crimping portion 18 such that the finished attachment will have the rather pointed leading and trailing edge crimping portions 20' and 24' illustrated in FIGS. 10 and 11, which is useful for fragile materials where larger leading and trailing crimping portions would tend to tear the fabric being decorated.

In FIG. 12, the alignment of the supply strip 10 is performed in a somewhat different function. Here, at least one of the intermittently driven feed rollers 102, 104, is provided with sprocket teeth 106 which are received by sprocket holes 108 spaced along the length of the supply strip 10. Much like the sprocket feed of motion picture film, this arrangement also guarantees that the design portions 12 of the strip 10 will always end up fully visible on the bight portions of the attachments 14 being formed.

Figure 13:
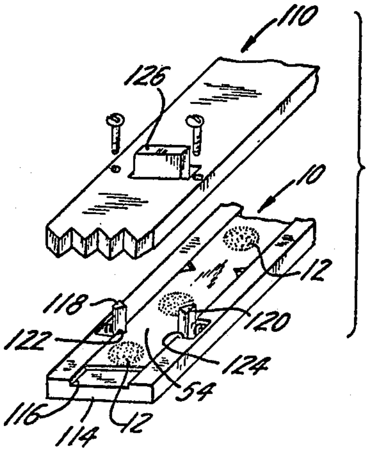
FIG. 13 shows an exploded prospective view of a trimmer constructed in accordance with the instant invention.

In the embodiments of FIG. 2 through FIG. 11, the supply strip 10 and/or the apparatus for forming the attachments are provided with means for establishing the start position of the supply strip, it being assumed that in a great majority of the cases, the supply strip will be so manufactured that the first design portion 12 thereof will not be exactly spaced from the leading edge 54 of the supply strip as to guarantee the formation of a perfect attachment on the very first cycle of operation. Thus, in various ones of the embodiments described thus far, the operator inserts the supply strip into the cutter block 34 and either visually or physically senses the first, proper starting position. In FIG. 13, however, there is shown a trimmer 110 which is a separate attachment in which the operator can first trim the end of the supply strip 10 and then insert it all the way into the cutter block 34 of the apparatus until its trimmed leading edge 54 abuts the stop 56 while still knowing that all attachments to be formed will be properly oriented with the design portions 12 on the bight portions of the attachment. The trimmer 110 includes an upper and lower plate 112 and 114 respectively, which define a path 116 for the supply strip 10 therethrough. A pair of spring-biased detent members 118 and 120 are biased to intersect the path 116 and will enter the V notches 122 and 124 centered on the midpoint of the crimping portion 18 disposed between adjacent design portions 12. Once this has occurred, the operator manually depresses a cutter blade 126 to shear the supply strip 10 along the leading edge 54. At this time, the operator can now insert the supply strip 10 into the cutter block 34 of the apparatus and merely continue the insertion until the leading edge 54 abuts the stop 56. Since the edge has been properly trimmed beforehand, the design portion 12 necessarily ends up centered above the anvil 22 such that all attachments will be formed in the proper desired fashion.

Thus, there has been described novel apparatus and method for forming and applying decorative attachments to a pierceable material from a continuous supply strip, itself of novel configuration. The supply strip is comprised of juxtaposed desgin and crimping portions and means for establishing a proper starting position in an apparatus which includes locater means for establishing the proper starting position and thereby guaranteeing the production of fully visible decorative designs.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. A method for applying designs to pierceable materials from a supply strip containing intermittent design portions equally spaced along the length of said supply strip, which method comprises, a. determining a proper starting point for said supply strip by employing a locating device on said supply strip;

b. severing the end of said supply strip at a position determined by said starting point, to form a first crimping portion;

c. thereafter intermittently feeding said supply strip to a severing, bending, driving and crimping station;

d. severing a blank from the end of said supply strip to form a second crimping portion with a design portion disposed intermediate said first and second crimping portions;

e. bending said first and second crimping portions in an approximate U-shape by draping said blank over an anvil;

f. positioning a material to be decorated over the face of a clinching die; and g. attaching said approximately U-shaped blank to said material by projecting said crimping portions through said material and into said clinching die.

2. The method of claim 1 wherein the step of determining a proper starting point comprises the step of visually aligning an indicia on said supply strip with a predetermined check point.

3. The method of claim 1 wherein the step of determining a proper starting point comprises the step of sensing the location of removed portions of said supply strip.

4. The method of claim 1 wherein the step of determining a proper starting point comprises the step of passing a guide pin through an aperture in said supply strip.

* * * * *